United States Patent [19]

Göttling et al.

[11] Patent Number: 5,246,237
[45] Date of Patent: Sep. 21, 1993

[54] SEAL FOR A WORK CYLINDER OPERATED BY PRESSURIZED FLUID

[75] Inventors: Helmut Göttling, Isernhagen; Rudolf Möller; Gerhard Scharnowski, both of Gehrden; Norbert Fortmann, Hanover, all of Fed. Rep. of Germany

[73] Assignee: Mannesmann Aktiengesellschaft, Dusseldorf, Fed. Rep. of Germany

[21] Appl. No.: 866,036

[22] Filed: Apr. 8, 1992

[30] Foreign Application Priority Data

Apr. 9, 1991 [DE] Fed. Rep. of Germany ....... 4111887

[51] Int. Cl.⁵ .............................................. F16J 15/32
[52] U.S. Cl. ................................ 277/205; 277/212 R; 92/137
[58] Field of Search ............... 277/205, 212 R, 212 C, 277/212 F; 92/137

[56] References Cited

U.S. PATENT DOCUMENTS

| | | | |
|---|---|---|---|
| 1,894,711 | 1/1933 | Schacht | 277/205 |
| 2,214,261 | 9/1940 | Roth | 277/212 C |
| 2,471,897 | 5/1949 | Rappl | 277/212 F X |
| 2,524,271 | 10/1950 | Rappl | 92/137 X |
| 2,757,947 | 8/1956 | Whitten | 277/205 |
| 2,815,995 | 12/1957 | Young | 277/212 C X |
| 2,818,287 | 12/1957 | Josephson | 277/205 |
| 2,832,223 | 4/1958 | Couraud | 277/205 X |
| 2,963,330 | 12/1960 | Arnes | 277/205 X |
| 3,199,831 | 8/1965 | Sully | 277/205 X |
| 3,388,638 | 6/1968 | Brinkel | 277/205 X |
| 3,777,626 | 12/1973 | Schürenberg et al. | 92/137 |
| 4,417,503 | 11/1983 | Izumi | 277/205 X |
| 4,989,498 | 2/1991 | Mori et al. | 277/212 C X |
| 5,020,421 | 6/1991 | Podlesak | 92/137 |
| 5,022,311 | 6/1991 | Fortmann et al. | 92/137 |
| 5,035,171 | 7/1991 | Gottling et al. | 92/137 |
| 5,144,883 | 9/1992 | Müller et al. | 92/137 |

FOREIGN PATENT DOCUMENTS

| | | |
|---|---|---|
| 10790 | 11/1955 | Fed. Rep. of Germany . |
| 1956148 | 4/1966 | Fed. Rep. of Germany . |
| 2249201 | 8/1973 | Fed. Rep. of Germany . |
| 2404244 | 8/1975 | Fed. Rep. of Germany ........ 92/137 |
| 3533731A1 | 3/1987 | Fed. Rep. of Germany . |
| 3914889A1 | 11/1990 | Fed. Rep. of Germany . |
| 1327702 | 4/1963 | France ............................ 277/212 C |

Primary Examiner—William A. Cuchlinski, Jr.
Assistant Examiner—Scott W. Cummings
Attorney, Agent, or Firm—Cohen, Pontani, Lieberman, Pavane

[57] ABSTRACT

A seal for a work cylinder operated with pressure fluid, through which cylinder an axially displaceable coupling element connected with the work cylinder, particularly a pull means, is extended in a fluid-tight manner from the inside of the cylinder. To obtain a better sealing of the inside of the cylinder under all possible operating conditions, particularly when using coupling elements developed as pull means of a cross-sectional shape other than circular, the seal is comprised of a single cup-shaped piece, the bottom surface of the seal being provided with a cuff which tapers conically in axial direction towards the cup-shaped inside of the seal. The cuff is provided with a sealing opening which permits the passage of the coupling element therethrough. The seal is provided with a sealing ring on the outer periphery in the region of the open end.

8 Claims, 4 Drawing Sheets

SEAL FOR A WORK CYLINDER OPERATED BY PRESSURIZED FLUID

FIELD OF THE INVENTION

The present invention relates to a seal for a work cylinder by pressure fluid through which an axially displaceable coupling element connected with the work cylinder, in particular a pull means, extends in a fluid-tight manner out of the inside of the cylinder.

BACKGROUND OF THE INVENTION

A seal for a coupling element which is conducted out of the inside of a cylinder, such as, for example, a piston rod or a pull belt of a work cylinder operated by pressure fluid (either liquid or gas), is subject to particular mechanical stresses. The seal must sufficiently seal the inside of the cylinder in view of the friction exerted by the piston rod or the pull belt during its axial movement. Federal Republic of German Patent OS 39 14 889 discloses a seal for work cylinders provided with a pull belt. Such cylinders are known as piston-rodless work cylinders. In that piston-rodless work cylinder, the receiving chambers for the sealing elements are in the cylinder covers, and the pull belt is conducted through the sealing elements in sealed fashion out of the inside of the cylinder. In that design, the pull belt is a flat steel tape. Typically, such steel tapes are sealed off at the two inside ends of the cylinder and, outside of the cylinder, are deflected by deflection rolls parallel to the cylinder and attached to a force-applying carriage which is guided along the length of the outer surface of the cylinder. The seals at the ends of the cylinder are each comprised of two sealing elements which form the seal upon being united and inserted into the corresponding receiving chambers in the cylinder covers. Each of the seal halves or seal elements has a sealing lip which, when joined, rests on the pull belt opposite each other transverse to the direction of movement, or longitudinal axis, of the pull belt. The pull belt, which is a steel tape, is thin so that it is flexible and can wrap around the deflection rolls. Nevertheless, in the case of traditional pull belts, the sealing lips are not applied optimally in the region of the edge, and, as a result, leaks occur in these regions. Also, the edges of the pull belts can be so sharp that they cut into the sealing lips when the pull belt shifts laterally during its movement thereby eliminating the sealing action within this region.

Federal Republic of German Patent Document AS 1,293,037 discloses a seal for use with a steel tape as pulling means in which bar-shaped elastic elements are provided as a seal for the pulling means. The elastic elements are positioned in the cylinder covers transverse to the longitudinal axis of the pull belt. These elastic cylindrical elements are made so that they exert mechanical stress against the cylinder covers and thus apply themselves against the steel tape.

Although sealing lips could be eliminated because the elastic elements have a round cross section, this seal, like the above-mentioned seals, does not provide a sufficient seal in the narrow-edge region proximate to the steel tape or pull belt.

If pull means are used that have a cross-sectional shape that differs from the known "steel tape", then known seals can no longer be used.

European Patent Document 0 384 032 discloses a pull means having a cross sectional shape that differs from circular or from the typical steel-tape shape. Instead, a pull belt having an oval cross-sectional shape, among others, is disclosed. The pull belt is formed of a flexible plastic material which is internally reinforced by, for example, embedded pull strands. Such a pull means, as already stated, cannot be sealed with traditional seals.

SUMMARY OF THE INVENTION

The object of the present invention therefore is to create a seal for work cylinders operated with pressure fluid which produces a better sealing of the inside of the cylinder under all possible operating conditions, particularly when using coupling elements for use with pull means having a continuous cross-sectional contour other than circular.

The present invention has a number of advantages. When using pull belts having a preferred cross-sectional shape that is other than circular or the ordinary steel tape cross section, the seal of the present invention provides a better seal of the inside of the cylinder because the seal surrounds the pull means more tightly. By this it is meant that the lateral or vertical shafts of the pull means, which frequently occur during the operation of the pull means, are compensated for by the shape and development of the seal, and that a good seal is assured under all operating conditions. The good vertical and lateral displaceability maintains an optimal seal and is created by making the wall region between sealing ring and bottom portion of the seal thinner. In this way, the bottom portion of the seal, which is provided with a cuff having a sealing opening, can shift and respond to the movement of the pull belt. As a result of the ability of the bottom portion to shift, the outer sealing ring does not cant or lift away from the inner surface of the cylinder cover. The thinned portion of the seal's wall is thus able to act in a spring-like fashion like a bellows. Triangular portions of material are formed on the longitudinal sides of the cuff on the bottom portion of the seal or are attached to it to reinforce and stiffen the longitudinal sides of the sealing opening and thus provide a corresponding sealing tension against the pull belt. To further increase this sealing tension, the sealing opening is performed so that it has a convex bulge along its longitudinal sides. As a result, the seal of the present invention provides an excellent seal when using pull belts of flat-oval cross section. Since the edges of the sealing opening are rounded, they thus adapt themselves to the correspondingly shaped pull belt and avoid cutting by the pull belt into this edge region while also increasing the sealing action in this critical edge region, contrary to known prior art seals. The sealing ring, which is formed in one piece on the outer periphery in the region of the open end of the cup-shaped seal, is shaped to have two parallel sealing lips. These sealing lips on the outer circumference act as a static seal, by which is meant that the sealing lips are stationary with respect to the cylinder-cover inner wall against which they rest. The sealing opening, which illustratively has a flat-oval cross section is a dynamic seal. In addition to surrounding the axially moving pull belt and sealing off the inside of the cylinder, the sealing opening also compensates for the vertical and lateral shifting of the pull belt.

The use of a reinforcing bead inside the seal and substantially opposite to the outer sealing ring provides a seal between the seal and the inner surface of the cylinder cover. The use of a support bead on the bottom portion of the seal provides a seal between the seal and the tensile belt. The reinforcing bead and the support bead both allow the tensile belt to shift vertically and laterally without breaking the seal created by the seal of the present invention. The inner seal opening is able to continuously move along with the tensile belt without spreading apart. In this way, in every operating condition, optimal sealing action is obtained. The seal is preferably comprised of an elastic material, such as a resilient plastic, and can easily be manufactured by plastic injection molding.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE PRESENTLY PREFERRED EMBODIMENT

Figure 1:
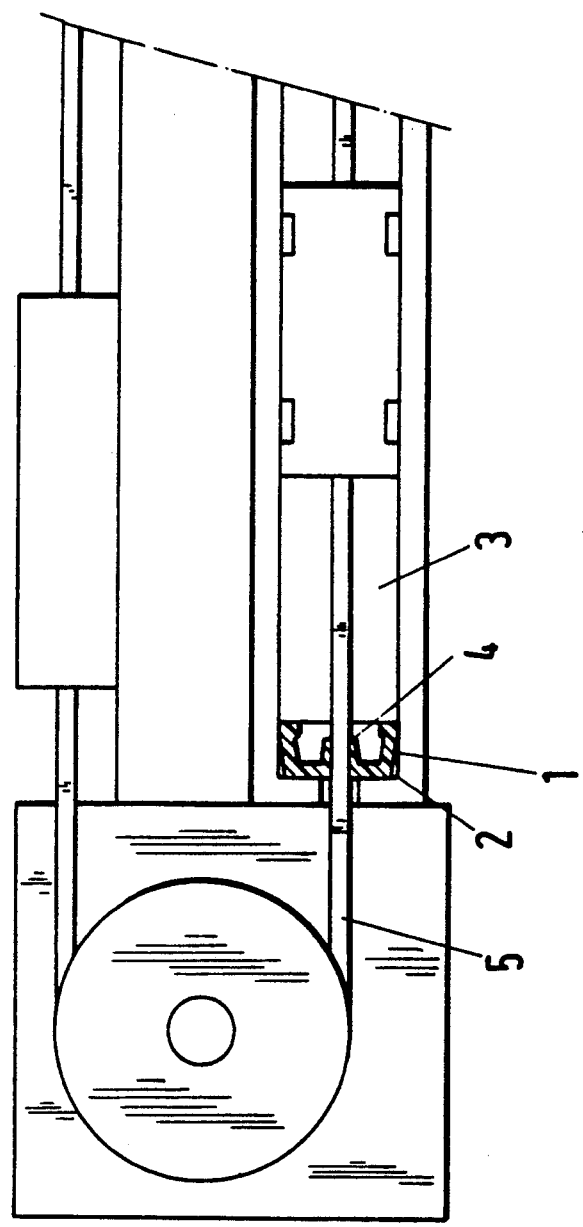
FIG. 1 shows a portion of a piston rodless work cylinder showing the seal of the present invention.

FIG. 1 shows a partial section through a piston-rodless work cylinder provided with a seal 1 of the present invention. In FIG. 1 only half of the cylinder's length is shown. On the other end of the inside of the cylinder, a seal is correspondingly positioned in a mirror image. Seal 1 is mounted into a depression 2 at the corresponding ends of the bore 3 of working cylinder or into cylinder covers. Seal 1 is preferably cup-shaped and has its open end facing the central portion of bore 3 of the cylinder. Cuff 4 is thus directed towards the center of the bore 3 of the cylinder. As shown more clearly in the side views of seal 1 shown in FIGS. 3 and 4, cuff 4 is formed so that it has a substantially conically shaped sealing opening 13. The design of cuff 4 provides a good seal so that the working pressure of the fluid (liquid or gas) present within bore 3 of the cylinder acts upon cuff 4 and its sealing opening 13 so that cuff 4 is urged against pulling belt 5. Cuff 4 contacts pulling belts only in the region of sealing opening 13. The design of seal 1 also provides a large surface area which is under the effect of the pressurized fluid within the cylinder which aids in providing a fluid-tight seal. As the fluid pressure within the cylinder increases, so too does the sealing action of seal 1, thereby assuring optimal sealing action under all working pressures and also under varying working pressures.

Figure 2:
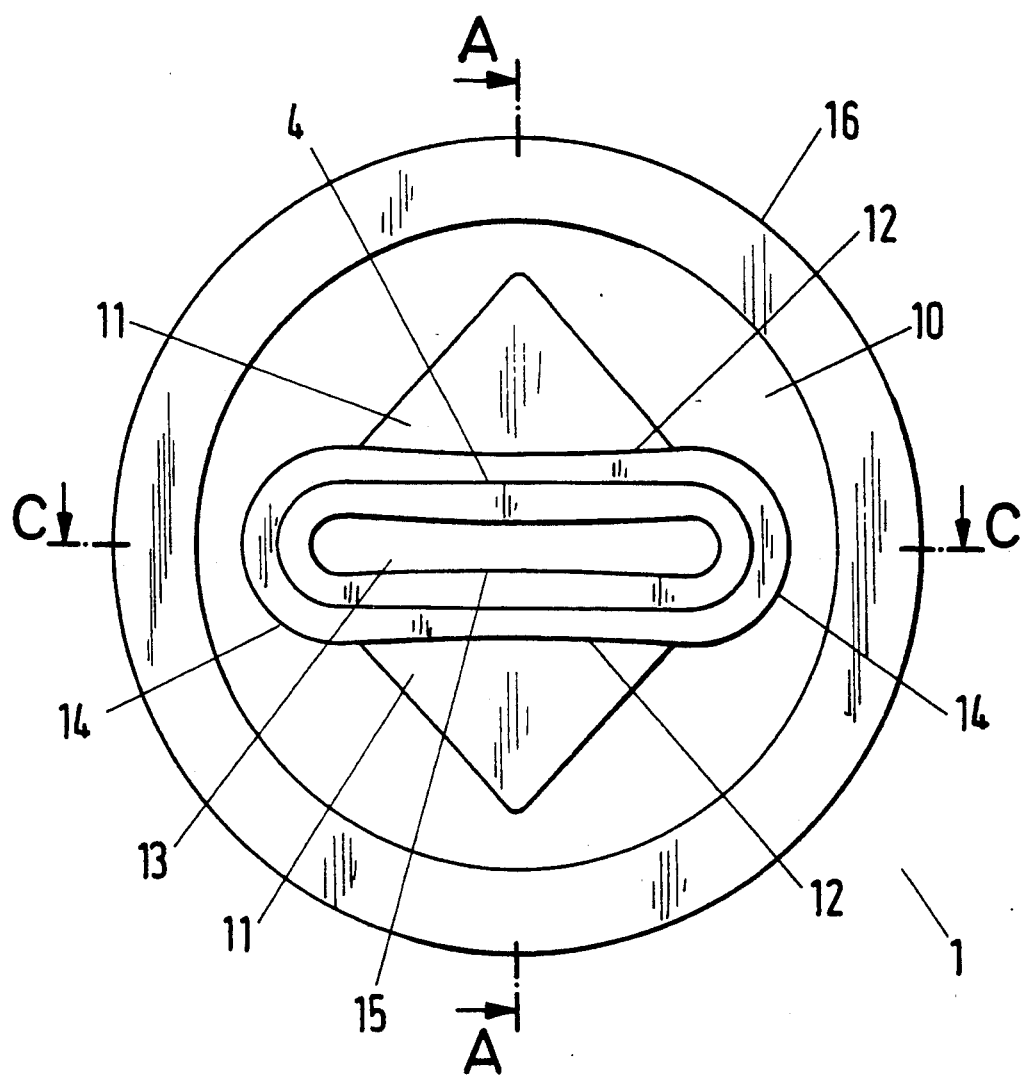
FIG. 2 is a front view of the seal of the present invention.
Figure 3:
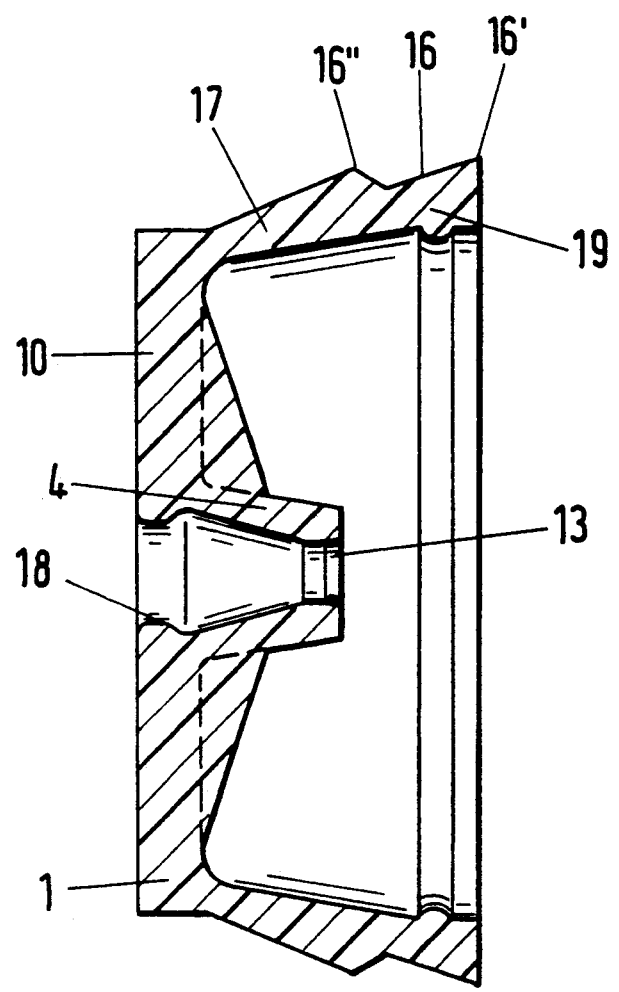
FIG. 3 is a side sectional view of the seal of the present invention, along line III—III in FIG. 2.

FIG. 2 is a front view of cup-shaped seal 1 of the present invention. On the bottom portion 10 of seal 1 are preferably two stiffening portions 11 which reinforce and stiffen the longitudinal sides 12 of sealing opening 13 of cuff 4. The stiffening portions 11 are preferably triangular and wedge shaped, as shown in FIGS. 2 and 3. If, during its operation, pulling belt 5 should be vertically displaced, sealing opening 13 of cuff 4 correspondingly moves, thereby assuring a good seal. As shown in FIG. 2, longitudinal sides 12 of cuff 4 preferably have a protruding convex bulge 15 at their centers. Thus, cuff 4 is mechanically prestressed in its sealing opening 13 to provide a good seal with pulling belt 5. Sealing opening 13 is preferably rounded on narrow sides 14 so that sealing opening 13 has an optimal sealing contour upon the use of a flat-oval pulling belt 5. The convex preshaping of sealing opening 13 is present only before seal 1 is installed; as installed, the convex contour can no longer be seen. Sealing ring 16 is positioned on the outer surface or circumference of seal 1 and is used to statically lock seal 1 into bore 3. Sealing ring 16 comprises two sealing lips 16', 16" which engage with the inner surface of cylinder bore 3. Sealing lips 16', 16" are annular in shape and extend parallel to one another around the outer periphery of seal 1.

Figure 4:
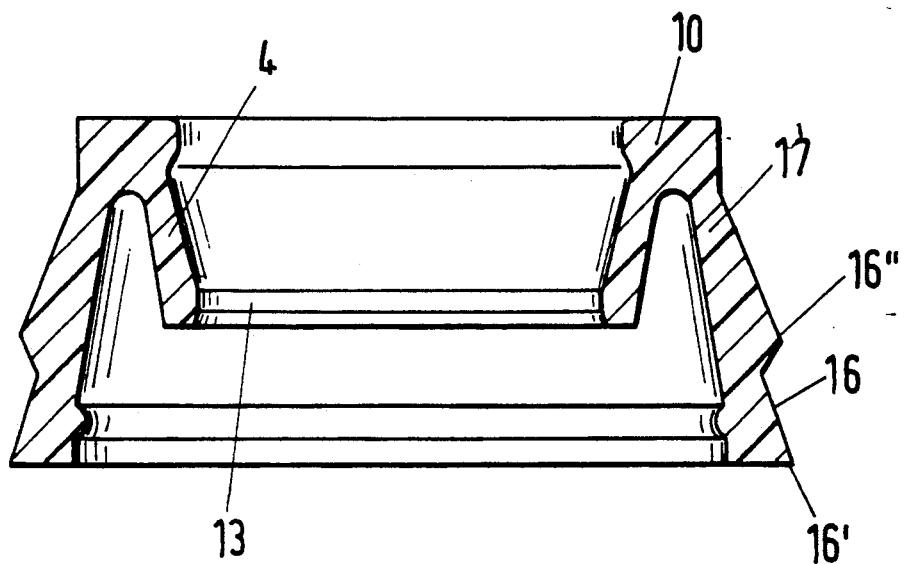
FIG. 4 is a side sectional view of the seal of the present invention, along line IV—IV in FIG. 2.

FIG. 3 shows in side view the cup-shaped seal of the present invention (along line III—III of FIG. 2). Between static sealing ring 16 and bottom portion 10 wall 17 of seal 1 is thinned so that bottom portion 10, together with cuff 4 and sealing opening 13, can move laterally within certain limits relative to static sealing ring 16. As shown in FIGS. 3 and 4, cuff 4 and wall 17 are substantially perpendicular to bottom portion 10. This thinning of wall 17 allows bottom portion 10 to displace vertically or laterally while maintaining the seal between static sealing ring 16 and the inner surface of bore 3. The thinned portion of wall 17 thus acts as mechanical buffer between the dynamic sealing region (seal opening 13 and cuff 4) and static sealing region (sealing ring 16). In bottom portion 10 near cuff 4, a supporting bead 18 is developed that is annular in shape and integral to bottom portion 10 of seal 1 to prevent sealing opening 13 from spreading open upon vertical or lateral displacement. Supporting bead 18 extends into sealing opening 13.

To increase and maintain the sealing action of the outer static seal, reinforcing bead 19 is developed integral to static sealing ring 16 between the sealing lips 16', 16" but on the inner surface of cup-shaped seal 1. Reinforcing bead 19 is annular in shape and is attached to and extends from the inner surface of the outer wall 17 of seal 1, as shown in FIGS. 3 and 4. Alternatively, this reinforcement can be supplied by a worm spring mounted so as to replace reinforcing bead 19.

FIG. 4 shows, in side view, a section along lines IV—IV of FIG. 2. FIG. 4 shows, outer static seal 16, the thinning of the wall 17 of the seal 1 near bottom portion 10, and the concave shape of cuff 4 in sealing opening 13.

The design of the single-piece seal of the present invention allows for simple and inexpensive manufacture in addition to functional advantages. The individual elements of the seal are so adapted to each other that a better sealing action of the inside of the cylinder results. This sealing action is even further increased upon an increase in the working pressure within the cylinder's bore because the design of the seal of the present invention allows its shape to adapt itself to the prevailing operating conditions.

The seal of the present invention can also be used when piston rods are employed. In such case, the sealing opening is adapted to the corresponding cross-sectional shape of the piston rod.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto.

What is claimed is:

1. A single piece seal for providing a fluid tight seal in a work cylinder bore for a work cylinder operated by pressurized fluid and by an axially displaceable coupling element operatively connected to the work cylinder comprising:
    a bottom portion (10) having a circumferential edge and a central portion;
    an outer wall portion (17) attached to the circumferential edge of said bottom portion (10) and extending from said bottom portion (10), said outer wall portion (17) having an outer surface and an inner surface;
    a cuff portion (4) attached to the central portion of said bottom portion (10), said cuff portion (4) extending from said bottom portion (10) and having a central axial sealing opening (13) being tapered substantially conically in an axial direction, the sealing opening having a bottom end with a bottom diameter and a top end with a top diameter, the top diameter being smaller than the bottom diameter, the bottom end being proximate to said bottom portion (10), the sealing opening (13) passing through said cuff portion (4) and said bottom portion (10) to allow the coupling element to slide tightly and sealingly therethrough, wherein said cuff portion (4) has longitudinal sides (12) that cause the sealing opening (13) to have a flat-oval cross-sectional shape, and wherein said longitudinal sides (12) have center portions and convex bulges (15) at said center portions of said longitudinal sides (12); and
    a sealing ring portion (16) attached to and extending from the outer surface of said outer wall portion (17).

2. The single piece seal of claim 1, further comprising a stiffening portion (11) attached to said bottom portion (10) and said cuff portion (4) to reinforce and stiffen said cuff portion (4).

3. The single piece seal of claim 2, wherein said cuff portion (4) has longitudinal sides (12) and further comprising two of said stiffening portions (11) that are triangular and wedge shaped, one of said stiffening portions (11) being attached to each of said longitudinal sides (12).

4. The single piece seal of claim 1, wherein said outer wall portion (17) is thinner proximate to said bottom portion (10) than proximate to said sealing ring portion (16).

5. The single piece seal of claim 1, wherein said sealing ring portion (16) comprises two annular sealing lips (16', 16'') which extend parallel to one another around said outer wall portion (17).

6. The single piece seal of claim 1, further comprising an annular reinforcing bead (19) attached to and extending from the inner surface of said outer wall portion (17).

7. The single piece seal of claim 1, wherein said bottom portion (10) further comprises an annular supporting bead (18) attached to said bottom portion (10) and extending into the sealing opening (13).

8. The single piece seal of claim 1, wherein said seal is comprised of an elastic material.

* * * * *